(12) United States Patent
Pagoto et al.

(10) Patent No.: US 7,501,580 B2
(45) Date of Patent: *Mar. 10, 2009

(54) PERSONAL COMPUTER WIRE MANAGEMENT SYSTEM

(76) Inventors: Anthony S. Pagoto, 50 Roosevelt St., Garden City, NY (US) 11530; Don A. Sebastian, 1 Bay Club Dr., Apt. 17W, Bayside, NY (US) 11360

(*) Notice: Subject to any disclaimer, the term of this patent is extended or adjusted under 35 U.S.C. 154(b) by 25 days.

This patent is subject to a terminal disclaimer.

(21) Appl. No.: 11/879,931

(22) Filed: Jul. 19, 2007

(65) Prior Publication Data

US 2007/0261874 A1 Nov. 15, 2007

Related U.S. Application Data

(63) Continuation of application No. 10/444,710, filed on May 23, 2003, now Pat. No. 7,247,798, which is a continuation-in-part of application No. 10/377,926, filed on Mar. 3, 2003, now abandoned.

(51) Int. Cl.
*H01J 5/00* (2006.01)

(52) U.S. Cl. ............... 174/138 E; 174/154; 174/72 A; 439/501

(58) Field of Classification Search .............. 174/138 E, 174/154, 72 A; 439/501; 242/388, 388.6, 242/400.1, 402, 405.1, 407, 601, 603, 613, 242/613.1, 613.2, 613.3

See application file for complete search history.

(56) References Cited

U.S. PATENT DOCUMENTS

| | | | | |
|---|---|---|---|---|
| 2,199,219 | A | * 4/1940 | Edwards et al. | ............. 439/458 |
| 5,574,257 | A | * 11/1996 | Brauer et al. | ................. 174/76 |
| 6,710,244 | B1 | * 3/2004 | Pferschy | ..................... 174/666 |

* cited by examiner

*Primary Examiner*—Dhiru R Patel
(74) *Attorney, Agent, or Firm*—John J. Tomaszewski, Esq.

(57) ABSTRACT

A wire management system is provided to neatly and efficiently assembly the many wires of an electronic component system such as a personal computer without tangling and intertwining. The system utilizes a container having axially aligned upright posts with hooks at their upper ends to keep wires wound around the posts in the wound position. A preferred embodiment utilizes axially aligned slots and movable and lockable posts in the slots to change the wiring configuration depending on the wire to be taken up. Clips may also be utilized to secure the wire in the container. Female and male mating flanges allow the user to connect one or more containers increasing the capacity of the wire management system. Another system uses pairs of posts with a space therebetween so that the wire can be wound around the outside of the posts or threaded through the space and also around the posts.

6 Claims, 8 Drawing Sheets

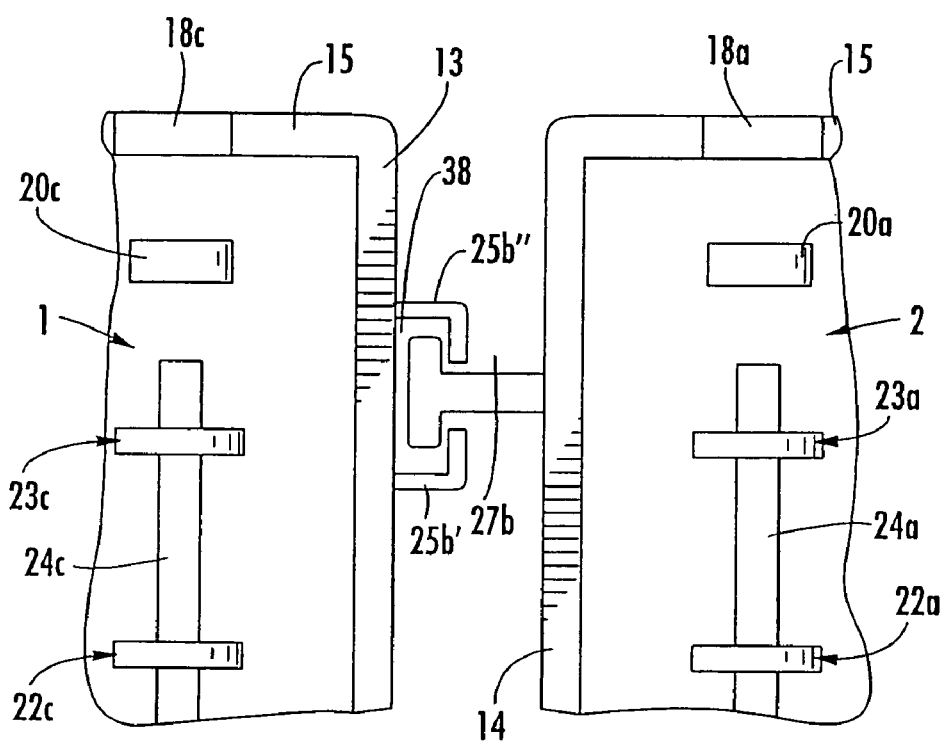
*FIG. 7*
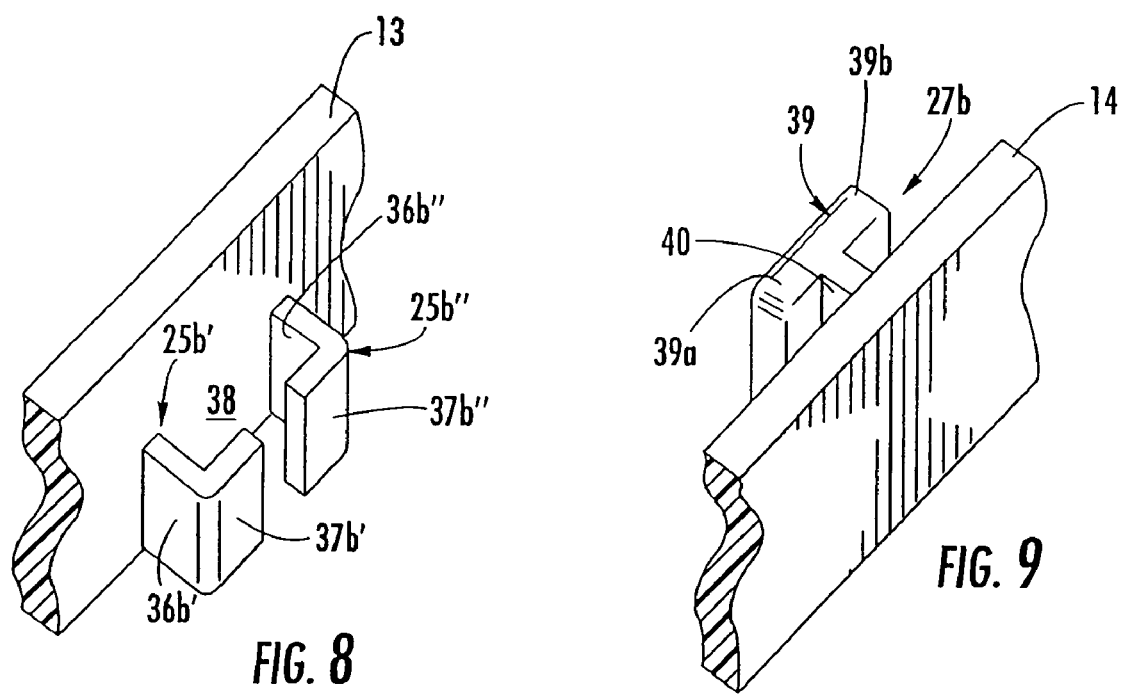
*FIG. 8*
*FIG. 9*

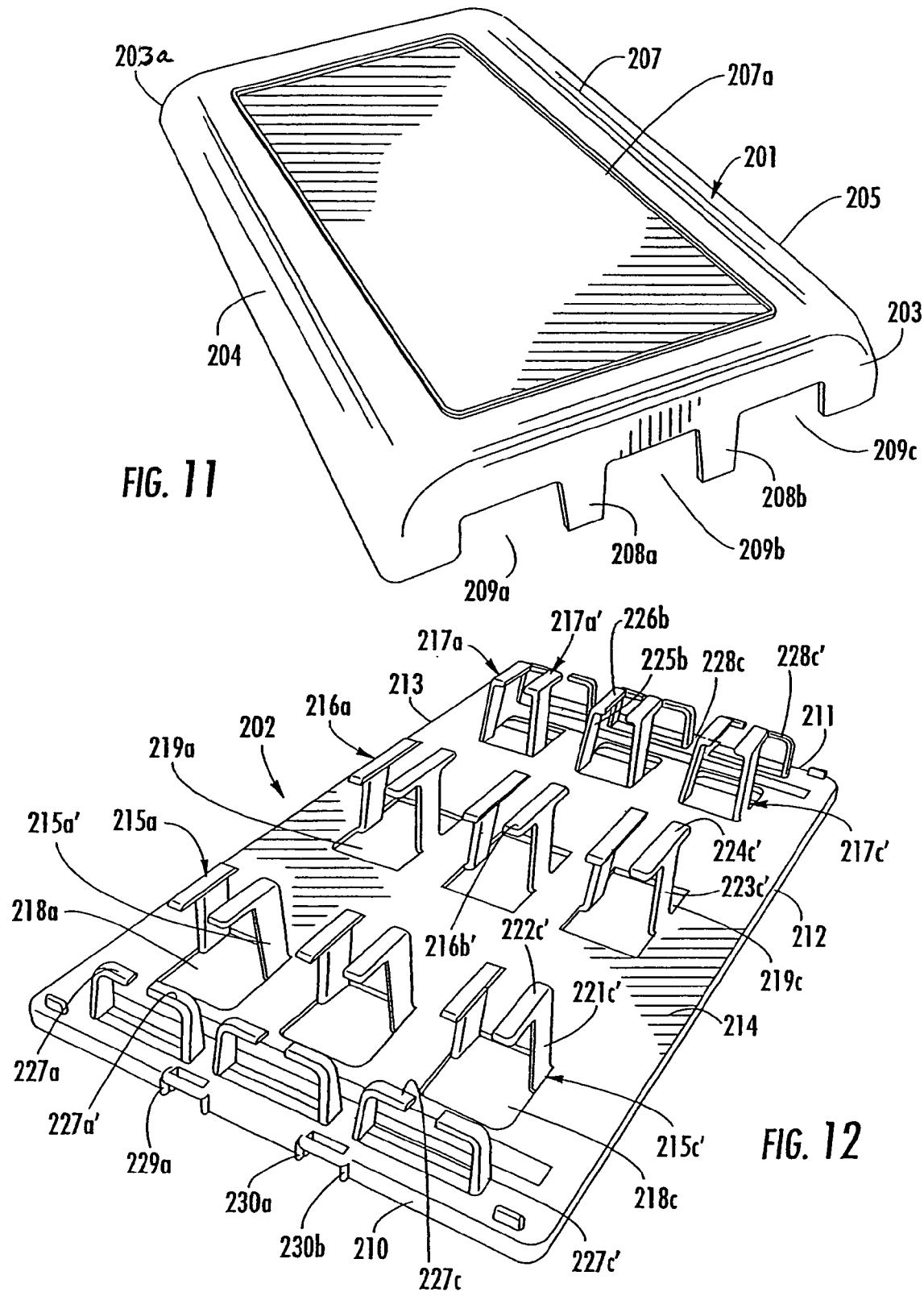

PERSONAL COMPUTER WIRE MANAGEMENT SYSTEM

This is a continuation of U.S. application Ser. No. 10/444,710 filed May 23, 2003, now U.S. Pat. No. 7,247,798 which application is a continuation-in-part of U.S. application Ser. No. 10/377,926 filed Mar. 3, 2003, now abandoned.

BACKGROUND OF THE INVENTION

1. Field of the Invention

The present invention relates generally to electronic components and, in particular, to a wire management system for holding the wires connecting the components so that the wires are not seen and are tangle free and easily accessible for rerouting or disconnection and replacement.

2. Description of Related Art

There has been a tremendous increase in the use of electronic components over the last few years particularly in the personal computer, audio and visual areas. Each of these components uses a large number of associated devices to form a system and each must be electrically connected to the main component or to other components in the system. Computers, for example, utilize a monitor, server, multiple printers, disk drives and the like. A television is now the central part of a home entertainment center system and includes a VCR, DVD, multiple speakers, and the like.

One common element with electronic components is the need to wire the components together to supply electricity and/or to relay electronic signals. For each component there is usually one wire and, for a typical personal computer, there are at least 5 or 6 wires which must be connected from an output component to an input component.

Since all the components are typically in the same general area, the multiplicity of wires results in a mass of intertwined and tangled wires. This wire mass is not only unsightly and dangerous but it is very difficult to wire and/or rewire the system.

Bearing in mind the problems and deficiencies of the prior are, it is therefore an object of the present invention to provide a wire management system by which the many wires of an electronic component system can be neatly and effectively assembled without tangling and intertwining.

Still other objects and advantages of the invention will in part be obvious and will in part be apparent from the specification.

SUMMARY OF THE INVENTION

The above and other objects and advantages, which will be apparent to those skilled in art, are achieved in the present invention which is directed to, in a first aspect, a wire management system comprising:

a rectangular container having front, rear and opposed sides, a bottom and preferably a cover;

one or more opposed pairs of openings in the front and rear sides, and/or in the opposed sides, one of the opposed pair of openings being an inlet opening and the other opposed opening being an exit opening;

two or more spaced apart vertically disposed posts aligned with each pair of opposed openings, the posts extending upward from the base and having an elongated hook at the top thereof, the hook preferably being transverse and/or axially disposed to the sides and preferably extending on both sides of the post;

whereby a wire at a desired point along the wire is passed through the inlet opening and wound around the aligned posts until the desired takeup is achieved and then the wire passed through the corresponding opposed exit opening.

In another aspect of the invention, a clip proximate at least one and preferably each of the opposed openings is employed for securing one or more wires, the clip proximate the inlet opening being the inlet clip and the clip proximate the exit opening being the exit clip.

In a further aspect of the invention one or more slots are employed extending axially between the aligned posts and corresponding inlet and outlet openings for holding two or more posts which can be moved and positioned in the slot and locked and secured therein.

In a still further aspect of the invention, mating flanges are employed on opposed sides of the container to connect one or more containers together.

In another aspect of the invention, a wire management system is provided comprising:

a rectangular base having front, rear and opposed edges and a bottom and a rectangular cover which fits over the base and is secured to the base, the cover having one or more opposed pairs of openings in the front and rear sides, and/or in the opposed sides, one of the openings being an inlet opening and the other opposed opening being an exit opening;

two or more spaced apart vertically disposed pairs of posts between the inlet and the outlet and each pair having a space between the posts, the pairs of posts extending upward from the base and having an elongated hook at the top of each post, the hooks preferably being extending along the longitudinal axis of the base;

wherein a wire at a desired point along the wire is passed the inlet opening and wound around the aligned posts until the desired takeup is achieved and then the wire passed through the corresponding outlet opening.

DRAWINGS

The present invention will be more apparent from the accompanying drawings, which are provided as non-limiting, and in which:

FIG. 7 is a partial plan view of two containers of the invention secured together to form a wire management system of the invention.

FIG. 8 is a partial perspective view of the female mating flange of FIG. 7 used in the wire management system of the invention.

FIG. 9 is a partial perspective view of the male mating flange of FIG. 7 used in the wire management system of the invention.

FIG. 11 is a perspective view of the cover of the wire management system shown in FIG. 10.

FIG. 12 is a perspective view of the base of the wire management system shown in FIG. 10.

DESCRIPTION OF THE PREFERRED EMBODIMENTS(S)

Figure 1:
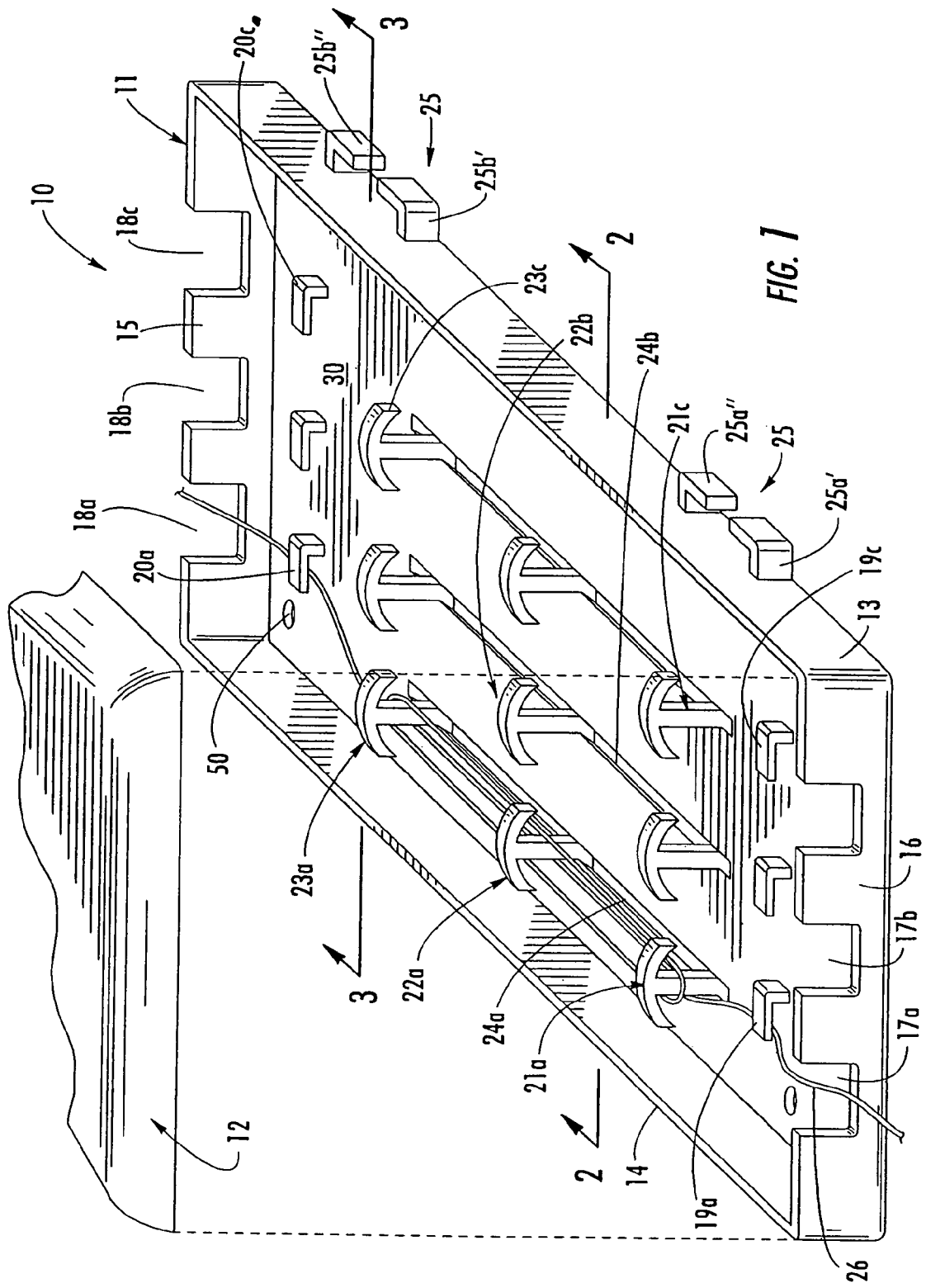
FIG. 1 is a perspective view of a wire management system of the invention.

Referring now to FIG. 1 a wire management system of the invention is shown generally as 10. The system has a base (container) 11 comprising a front 13, a back 14, and opposed input side 16 and exit side 15 and a bottom 30. The opposed input and exit sides have corresponding opposed openings 17a,17b and 17c and 18a, 18b and 18c, respectively. Opposed clips are proximate the input side and exit side and are designated 19a, 19b and 19c for the input clips and 20a, 20b and 20c for the exit clips, respectively. Corresponding slots 24a, 24b and 24c are axially disposed between the clips. Shown in the slots are input posts 21a, 21b and 21c which are proximate the corresponding input clips and input openings. Similarly exit posts 23a, 23b and 23c are proximate the exit clips and exit openings. Intermediate posts 22a, 22b and 22c are shown about mid-point of the slot. Two female mating flanges 25 having individual flanges 25a' and 25a'' and 25b' and 25b'' are shown on the front side 13 of the base 11. Corresponding male mating flanges 27 having individual flanges 27a and 27b are on the back 14 of the base 11 (not shown in this figure). The male mating flange would be inserted in the corresponding female mating flange to connect one or more bases to each other to provide a wire management system accommodating more wires. The system also employs a cover 12 which preferably force fits around the outside of the walls of the base 11. A wire 26 is shown entering input opening 17a, traveling under input clip 19a and being wrapped around posts 21a, 22a and 23a. The wire then continues under clip 20a and exits base 11 through exit opening 18a. The posts 21a, 22a and 23a if desired could be moved and secured in different parts in the slot 24a. Mounting holes 50 are used to secure the container to a wall or cabinet using a fastener such as a screw.

Figure 2:
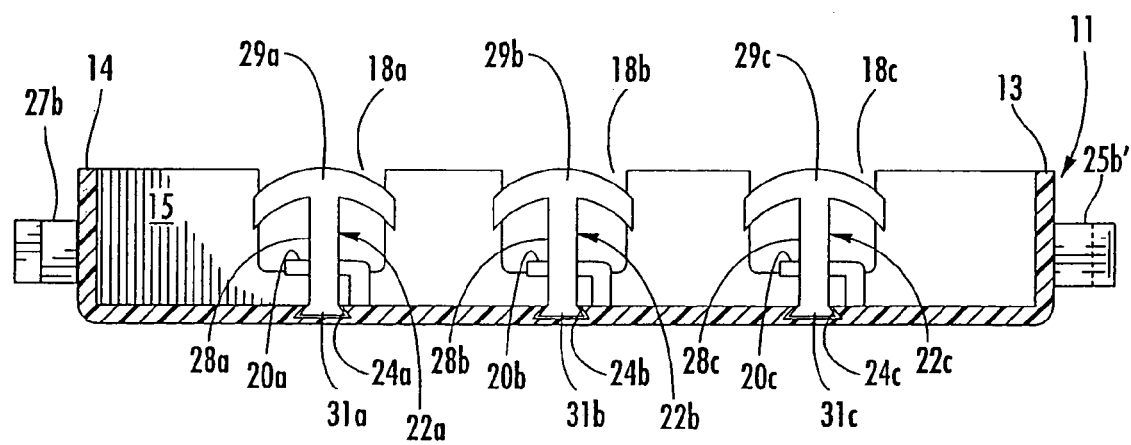
FIG. 2 is a sectional view of FIG. 1 taken along lines 2-2 of FIG. 1.

Referring now to FIG. 2 a sectional view of FIG. 1 is shown taken along lines 2-2. Female mating flange 25b' and corresponding male mating flange 27b are shown on the front 13 and back walls 14 of the base 11. Exit posts 22a, 22b and 22c comprise elongated vertical post portions 28a, 28b and 28c. At the upper end of the post is an inverted elongated U-shaped hook 29a, 29b and 29c. The lower end of the post will be shown in further detail below in FIG. 4 and has a triangular shaped base 31a, 31b and 31c which fits the contour of triangular shaped slot openings 24a, 24b and 24c in the bottom wall 30 of base 11. The posts are positioned at the desired point in the slots 24a, 24b and 24c and then twisted, e.g., 90 degrees, to lock them into the slot. The exit clips 20a, 20b and 20c are shown intermediate the posts and the exit sidewall 15 and corresponding exit openings 18a, 18b and 18c.

Figure 3:
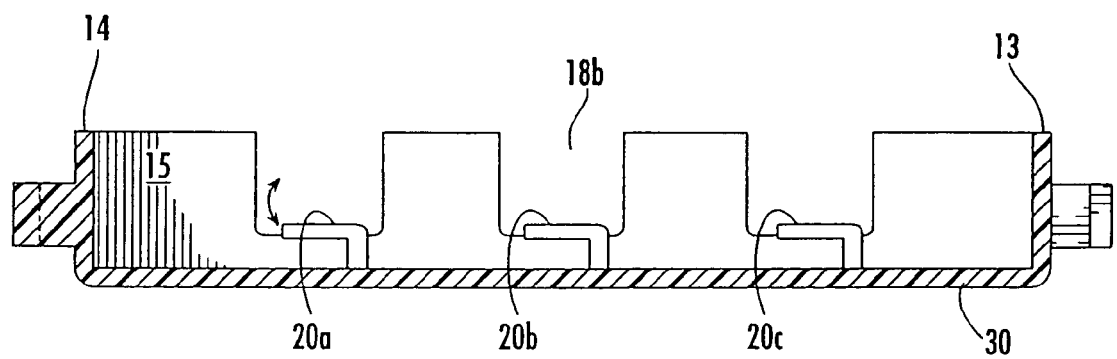
FIG. 3 is a sectional view of FIG. 1 taken along lines 3-3 of FIG. 1.

FIG. 3 shows exit clips 20a, 20b and 20c in front of sidewall 15. The clips are preferably resilient in an upward and downward motion as shown by the arrows and are preferably integral with the bottom.

Figure 4:
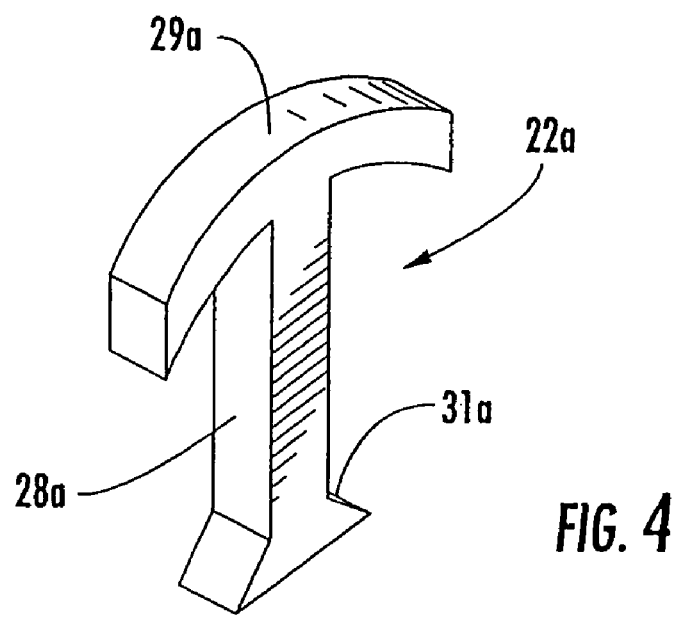
FIG. 4 is a perspective view of a post used in the wire management system of the invention.
Figure 5:
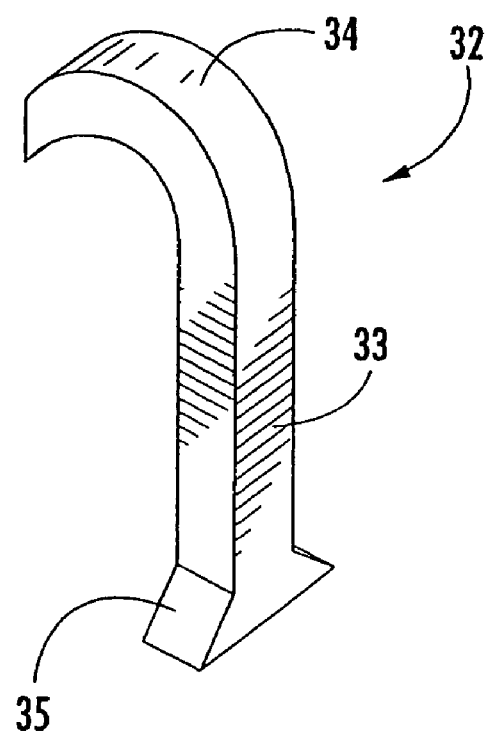
FIG. 5 is a perspective view of another post used in the wire management system of the invention.

FIG. 4 shows a perspective view of post 22a. All the posts are typically the same. The post has an elongated vertical post portion 28a, an inverted U-shaped elongated hook 29a and a triangular base 31a. The cap and base are shown in the same plane but this may be varied depending on desired configurations. The important feature is that the base be triangular or otherwise configured to fit into the slot and then locked therein by, e.g., twisting the base and locking it into the slot securing the post in the slot. FIG. 5 shows another post design 32. The post likewise has a triangularly shaped base 35 but has a downwardly arcuate sloped extension 34 extending in only one outward direction from the vertical post 33. The extension is shown transverse to the triangular base but the extension may be at any suitable angle to the base. The posts are shown rectangular but may be cylindrical or any other suitable shape.

Figure 6:
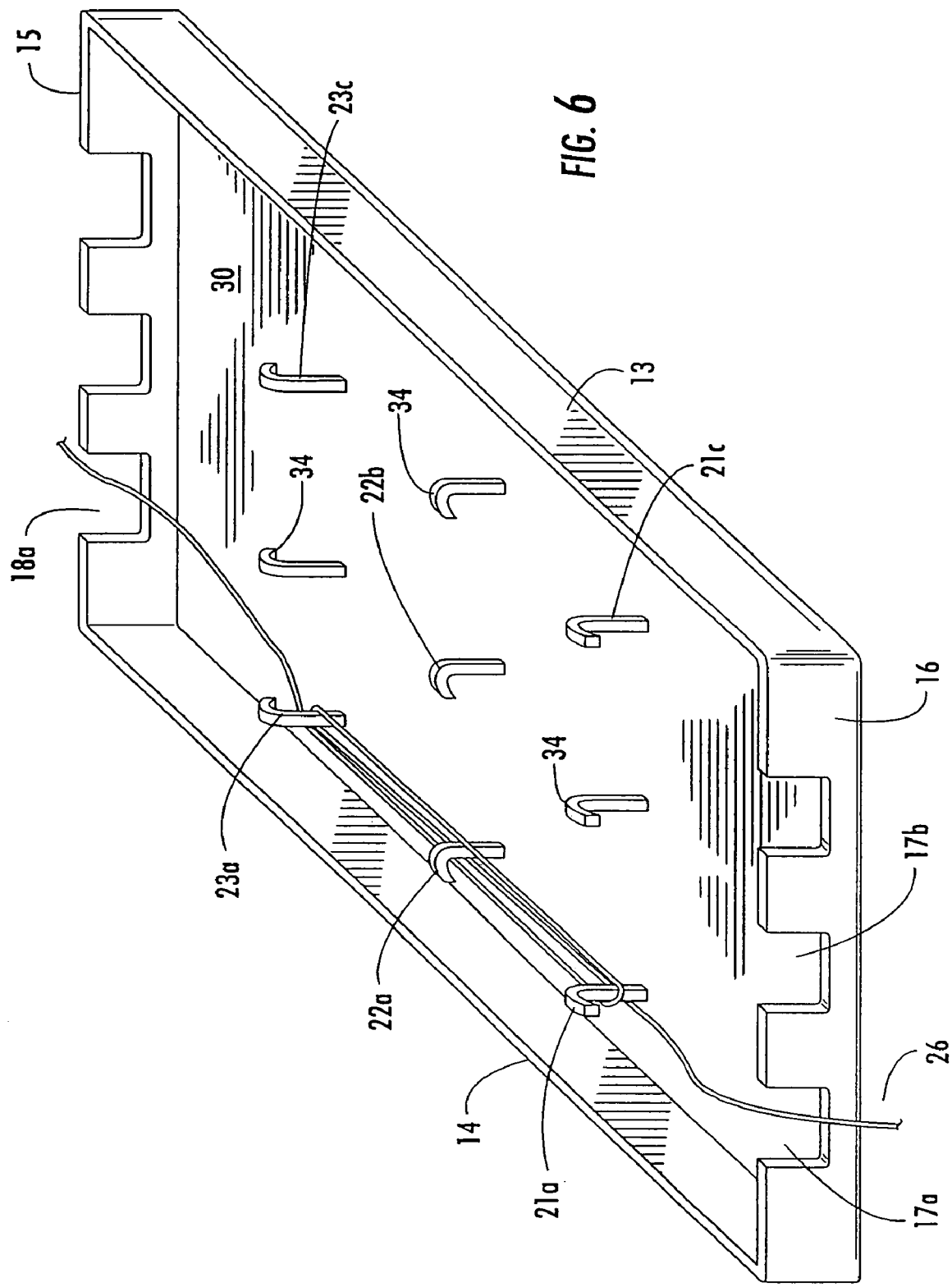
FIG. 6 is a perspective view of another wire management system of the invention.

FIG. 6 is similar to FIG. 1 except that this embodiment of the invention does not have slots, clips and male and female mating flanges. Three sets of three fixed posts 21a-23a, 21b-23b and 21c-23c are shown having an upper extension hook 34 thereon. The hooks for posts 21a and 23a are shown in the same plane as the longitudinal axis of the base 11 and hook 34 for the intermediate post is shown transverse to the longitudinal axis. Any suitable configuration could be used with the important consideration being that the posts have hooks preferably downward facing as shown in the figures.

FIG. 7 is a plan view of a portion of the wire management system of FIG. 1 showing the female mating flanges 25b' and 25b'' of container 1 mated with male flange 27b of container 2 to connect container 1 to container 2. Thus, male flange 27b of base 2 is inserted in the space 38 between female mating flanges 25b' and 25b'' of base 1 locking the two bases together.

FIG. 8 is a perspective view of the female flanges 25b' and 25b'' of FIG. 7. Flange 25b' extends from wall 13 and comprises a transverse outward portion 36b' and an sidewardly bent portion 37b' parallel to the wall. Flange 25b'' comprises an outward portion 36b'' and an sidewardly backwardly bent portion 37b'' also parallel to wall 13. An opening 38 is formed between flanges 25b' and 25b''.

FIG. 9 is a perspective view of the male flange 27b. The flange comprises an outwardly extending base portion 40 from back wall 14 and a transverse shoulder 39 having arms 39a and 39b. Shoulder 39 fits into opening 38 of FIG. 8 locking the two bases together as shown in FIG. 7.

Figure 10:
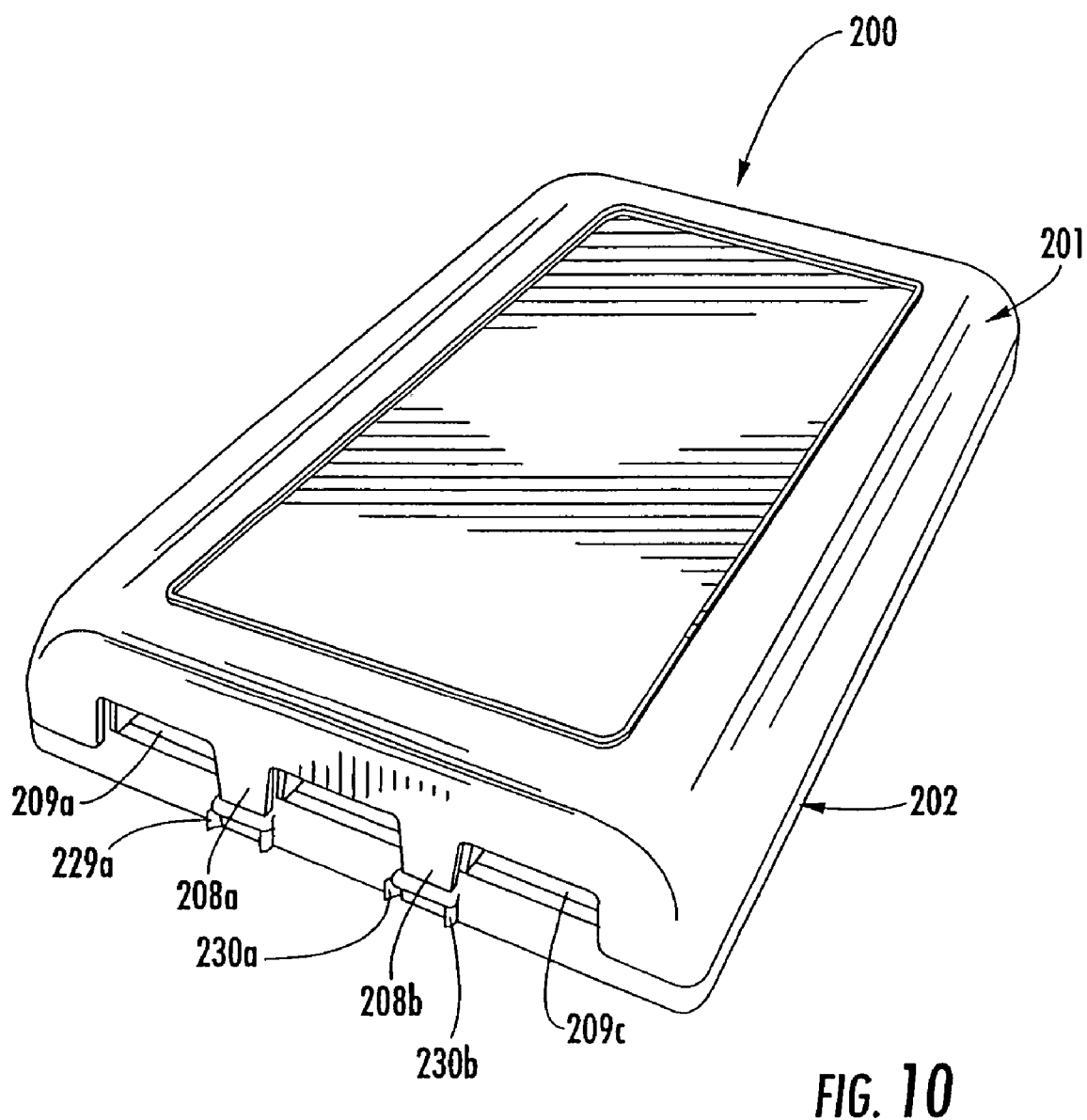
FIG. 10 is a perspective of another wire management system of the invention.

Referring now to FIG. 10, another wire management system of the invention is shown as numeral 200. The system comprises a cover 201 and a base 202. The cover has locking prongs 208a and 208b which fit into locking tabs 229a and 229b and 230a and 230b, respectively, securing the cover to the base. The cover has inlet openings 209a, 209b and 209c through which the wires are fed to manage the length of the wires.

FIG. 11 shows the cover 201 as having a top 207 with a raised section 207a, front 203, back 203a, and opposed sides 204 and 205.

FIG. 12 shows the base 202 having a front edge 210, back edge 211, and opposed side edges 212 and 213. The base is planar with a surface 214 having through openings 218a-c, 219a-c and 220a-c. There are three rows of inlet post pairs 215a-c and 215a'-c'. Each pair of posts has an upright member 221a-c and 221a'-c' and a hook at the upper end thereof 222a-c and 222a'-c'. Similar post pairs are shown at the exit end 211 as 217a-c and 217a'-c'. These posts have upright members 225a-c and 225a'-c' and hooks 226a-c and 226a'-c'. Intermediate pairs of posts are shown as 216a-c and 216a'-c' having vertical members 223a-c and 223a'-c' and hooks 224a-c and 224a'-c'. Inlet clips are shown as 227a-c and 227a'-c' and outlet clips 228a-c and 228a'-c'. The clips are used to hold the wire and the post pairs to wrap the wire around. Typically, the wire enters at the inlet end 210 and is secured to a clip. The wire is then wrapped around each post pair the desired number of times to shorten the wire the desired length and passed out the exit end 211 and secured by a clip. In a preferred method the wire is passed through the spaces between each pair of posts and wound around one or more of the vertical members. This utilizes the surface area of the base very effectively. When the wire or wires have been wound around the posts the cover is placed over the base and secured to the base.

Figure 13:
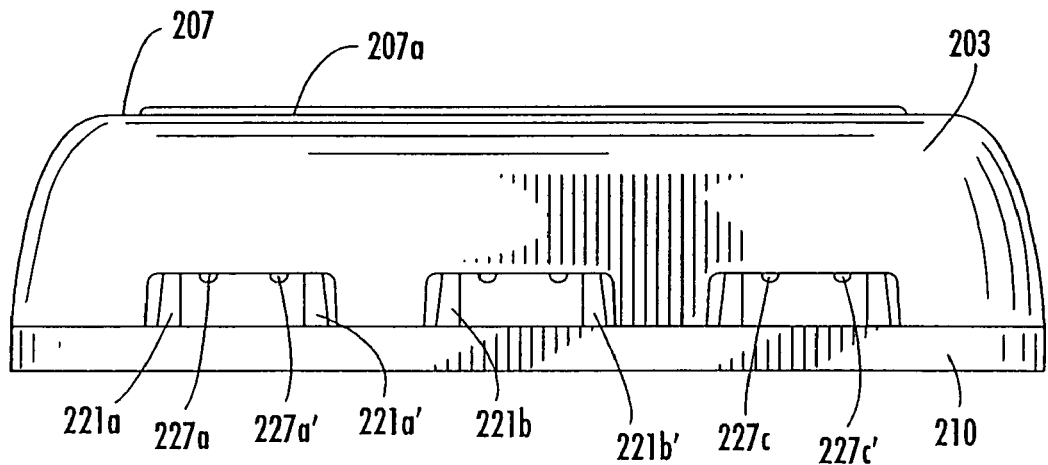
FIG. 13 is an elevational view of the front side of the wire management system shown in FIG. 10.

FIG. 13 shows the front of the assembled system. Vertical members of the posts are 221a-c and 221a'-c'. The clips are shown as 227a-c and 227a'-c'. The wires would enter openings 209a-c.

Figure 14:
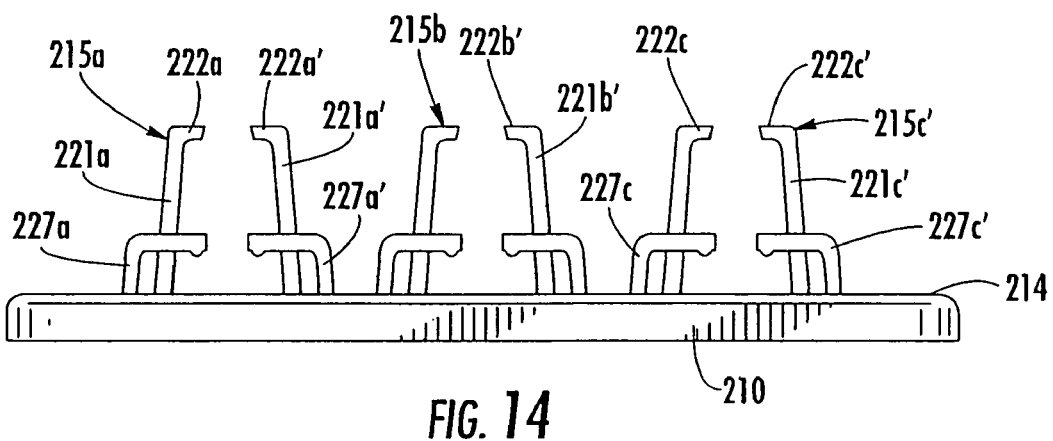
FIG. 14 is an elevational view of the front side of the base of the wire management system shown in FIG. 12.

FIG. 14 shows the base 210 and the inlet pairs of posts 215a-c and 215a'-c'. the inlet clips are shown as 227a-c and 227a'-c'.

Figure 15:
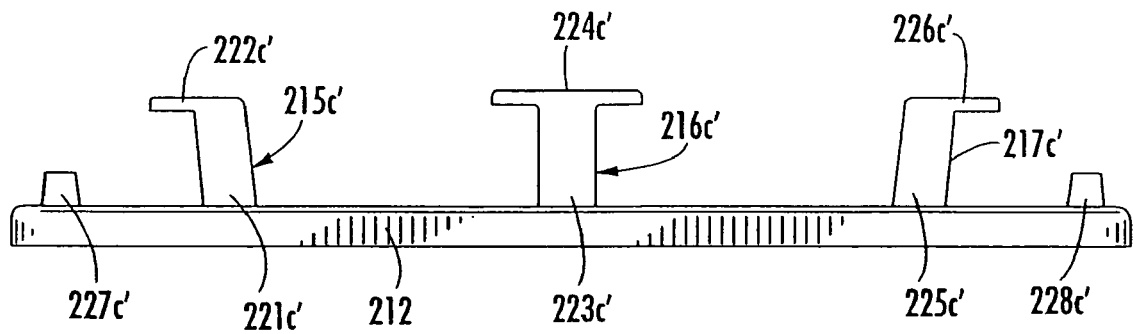
FIG. 15 is an elevational view of the side of the base of the wire management system shown in FIG. 12.

FIG. 15 shows the side 212 of the base. The base has inlet clip 227c' and exit clip 228c'. The posts are shown as 215c', 216c' and 217c'.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A wire management system comprising: a rectangular base having front, rear and opposed sides and a bottom and a rectangular cover having corresponding front, rear and opposed sides, which said cover fits over the base and is secured to the base, the cover having three opposed pairs of inlet openings in the front side and one or more opposed exit openings in the rear side; two or more vertically disposed pairs of elongated posts aligned between each of the opposed inlet openings and the exit openings and having a space between each said pair of elongated posts, the pairs of elongated posts extending upward from the base and having an elongated hook at the top of each of said posts, wherein at least one wire at the desired point along the wire is passed into one of said inlet openings and wound on one or more of the aligned elongated posts until the desired takeup is achieved and then the wire is passed out of the corresponding exit openings.

2. The wire management system of claim 1 wherein the cover has three inlet openings in the front side and three opposed exit openings in the rear side.

3. The wire management system of claim 2 wherein there are three sets of three vertically disposed pairs of elongated posts, each of said elongated posts having a front pair, a rear pair and an intermediate pair, and each of said elongated posts being spacedely aligned axially aong the bottom of the base between one of said inlet openings and a corresponding said exit openings, the front pair of elongated posts of each set being proximate the front edge of the base, the rear pair of elongated posts of each set being proximate the rear edge of the base and the intermediate pair of elongated posts of each set being intermediate the front and rear pairs.

4. The wire management system of claim 3 wherein the intermediate pair of each set are proximate the middle of the bottom of the base.

5. The wire management system of claim 4 wherein for each set of posts front inlet clips are disposed on the bottom of the base between the front side of the base and the front pair of posts and rear exit clips are disposed on the bottom of the base between the rear side of the base and the rear pair of posts.

6. The wire management system of claim 5 wherein the base has one or more locking tabs and the cover has one or more locking prongs, where the prongs fit into the tabs to secure the cover to the base.

* * * * *